(12) United States Patent
Hirata et al.

(10) Patent No.: US 12,491,581 B2
(45) Date of Patent: Dec. 9, 2025

(54) WAFER PRODUCING METHOD

(71) Applicant: DISCO CORPORATION, Tokyo (JP)

(72) Inventors: Kazuya Hirata, Tokyo (JP); Ryohei Yamamoto, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 728 days.

(21) Appl. No.: 17/818,416

(22) Filed: Aug. 9, 2022

(65) Prior Publication Data
US 2023/0048318 A1 Feb. 16, 2023

(30) Foreign Application Priority Data

Aug. 16, 2021 (JP) .................................. 2021-132371

(51) Int. Cl.
| | | |
|---|---|---|
| *B23K 26/53* | (2014.01) | |
| *B23K 26/00* | (2014.01) | |
| *B23K 26/06* | (2014.01) | |
| *B23K 26/38* | (2014.01) | |
| *B23K 101/40* | (2006.01) | |
| *B23K 103/00* | (2006.01) | |
| *H01L 21/304* | (2006.01) | |

(52) U.S. Cl.
CPC .......... *B23K 26/53* (2015.10); *B23K 26/0006* (2013.01); *B23K 26/0643* (2013.01); *B23K 26/38* (2013.01); *H01L 21/304* (2013.01); *B23K 2101/40* (2018.08); *B23K 2103/56* (2018.08)

(58) Field of Classification Search
CPC ................ B23K 26/38; B23K 26/0643; B23K 26/0006; H01L 21/0643; H01L 23/544
See application file for complete search history.

(56) References Cited

U.S. PATENT DOCUMENTS

| 2006/0091126 A1* | 5/2006 | Baird ..................... B23K 26/40 |
| | | 219/121.72 |
| 2016/0158881 A1 | 6/2016 | Hirata et al. |
| 2018/0085851 A1 | 3/2018 | Hirata |

FOREIGN PATENT DOCUMENTS

| JP | 2000094221 A | 4/2000 |
| JP | 2004526575 A | 9/2004 |
| JP | 2013049161 A | 3/2013 |
| JP | 2014229843 A * | 12/2014 |

(Continued)

OTHER PUBLICATIONS

Office Action issued in counterpart Japanese patent application No. 2021-132371, dated Apr. 15, 2025.

*Primary Examiner* — Thien S Tran
(74) *Attorney, Agent, or Firm* — Greer Burns & Crain Ltd.

(57) ABSTRACT

A wafer producing method includes a peel-off layer forming step of forming a peel-off layer by positioning a focused spot of a laser beam having a wavelength transmittable through an ingot to a depth corresponding to a thickness of the wafer to be produced from the ingot from a first end surface of the ingot and applying the laser beam to the ingot, a first chamfered portion forming step of forming a first chamfered portion by applying, from the first end surface side to a peripheral surplus region of the wafer, a laser beam having a wavelength absorbable by the wafer, a peeling-off step of peeling off the wafer to be produced, and a second chamfered portion forming step of forming a second chamfered portion by applying, from a peel-off surface side of the wafer, the laser beam having a wavelength absorbable by the wafer.

9 Claims, 9 Drawing Sheets

(56) References Cited

FOREIGN PATENT DOCUMENTS

| | | | | |
|---|---|---|---|---|
| JP | 2016111143 A | | 6/2016 | |
| JP | 2016111150 A | * | 6/2016 | ............. C30B 33/06 |
| JP | 2018056347 A | * | 4/2018 | ......... B23K 26/0626 |
| WO | 2002060636 A1 | | 8/2002 | |

* cited by examiner

WAFER PRODUCING METHOD

BACKGROUND OF THE INVENTION

Field of the Invention

The present invention relates to a wafer producing method of producing a wafer by processing an ingot.

Description of the Related Art

Such devices as integrated circuits (IC), large-scale integration (LSI) circuits, and light emitting diodes (LEDs) are formed with a functional layer being stacked on a front surface of a wafer made of such a material as silicon (Si) or sapphire ($Al_2O_3$) and then demarcated by planned dividing lines. In addition, power devices, LEDs, and the like are formed with a functional layer being stacked on a front surface of a wafer made of silicon carbide (SiC) and then demarcated by planned dividing lines. Wafers with devices formed thereon are divided into individual device chips by processing being performed on the planned dividing lines by a cutting apparatus or a laser processing apparatus, and the divided device chips are used for such electronic equipment as a mobile phone and a personal computer.

Wafers with devices formed thereon are typically produced by a cylindrical ingot being cut thin by a wire saw. The wafer produced is finished to a mirror surface with a front surface and a back surface thereof being polished (see, for example, Japanese Patent Laid-open No. 2000-94221).

Yet, cutting the ingot by a wire saw and polishing the front surface and the back surface of the cut wafer result in a majority (70% to 80%) of the ingot being thrown away, posing the problem of being uneconomical. Especially an SiC ingot, which is high in hardness, is difficult to cut by a wire saw, requiring a considerable amount of time for processing and thus resulting in low productivity. Moreover, SiC ingots being expensive also poses a challenge to efficient production of wafers.

As such, the applicant of the present invention has proposed a technology of forming a peel-off layer in a planned cutting plane by positioning, inside an SiC ingot, a focused spot of a laser beam having a wavelength transmittable through SiC and then applying the laser beam to the SiC ingot, to thereby peel off a wafer from the SiC ingot along the planned cutting plane in which the peel-off layer has been formed (see, for example, Japanese Patent Laid-open No. 2016-111143).

SUMMARY OF THE INVENTION

Yet, the processing process to be performed after the wafer has been peeled off from the ingot has not yet been established, making it difficult to efficiently process the wafer. Especially, with respect to a wafer formed from a material high in hardness such as SiC, performing chamfering processing by causing grinding stones to come into contact with a periphery of the wafer requires a long time, resulting in low productivity.

The abovementioned problem can also possibly occur in the technology of forming a peel-off layer in a planned cutting plane by positioning, inside an ingot made of silicon, sapphire, or the like, a focused spot of a laser beam having a wavelength transmittable through the ingot and applying a laser beam to the ingot, to thereby produce wafers.

It is accordingly an object of the present invention to provide a wafer producing method by which chamfering processing can be performed efficiently on a periphery of a wafer at the time of producing the wafer from an ingot.

In accordance with an aspect of the present invention, there is provided a wafer producing method of producing a wafer by processing an ingot, the wafer producing method including a peel-off layer forming step of forming a peel-off layer by positioning a focused spot of a laser beam having a wavelength transmittable through the ingot to a depth corresponding to a thickness of the wafer to be produced from a planarized first end surface of the ingot and applying the laser beam to the ingot, a first chamfered portion forming step of forming a first chamfered portion on the first end surface by applying, from the first end surface side to a peripheral surplus region of the wafer, a laser beam having a wavelength absorbable by the wafer to be produced, a peeling-off step of peeling off, from the peel-off layer, the wafer to be produced, and a second chamfered portion forming step of forming a second chamfered portion by applying, from a peel-off surface side of the wafer to a peripheral surplus region on the peel-off surface of the wafer, the laser beam having a wavelength absorbable by the wafer to be produced.

Preferably, the wafer producing method includes, after the peel-off layer forming step, an identification (ID) creating step of creating an ID by applying, to a surplus region of the wafer, the laser beam having a wavelength absorbable by the wafer to be produced. Moreover, the wafer producing method preferably includes a chamfered portion grinding step of grinding the first chamfered portion and the second chamfered portion. Further, the wafer producing method preferably includes a wafer peel-off surface planarizing step of grinding and planarizing the peel-off surface of the wafer. Further, the wafer producing method preferably includes a mirror surface processing step of performing mirror surface processing on a front surface and a back surface of the wafer. Further, the wafer producing method preferably includes, after the peeling-off step, an ingot peel-off surface planarizing step of grinding and planarizing a peel-off surface of the ingot. Further, the ingot is preferably an ingot made of silicon carbide, and the wafer is preferably a wafer made of silicon carbide.

Further, preferably, a c-plane of the ingot made of silicon carbide is inclined with respect to a perpendicular line of the first end surface, and forms an off angle with the first end surface, and, in the peel-off layer forming step, the peel-off layer is formed with strip-shaped peel-off bands being disposed side by side in a Y-axis direction, the peel-off bands being obtained from cracks extending along the c-plane from a modified portion in which silicon carbide has been separated into silicon and carbon, by repeating a peel-off band forming step of forming the peel-off bands, by assuming a direction orthogonal to a direction in which the off angle is formed to be an X-axis direction and a direction orthogonal to the X-axis direction to be the Y-axis direction, positioning a focused spot of a laser beam having a wavelength transmittable through the ingot made of silicon carbide to a depth corresponding to a thickness of the wafer to be produced from the ingot, and applying the laser beam to the ingot made of silicon carbide while processing feeding the ingot made of silicon carbide and the focused spot relative to each other in the X-axis direction, and an indexing feed step of indexing feeding the ingot made of silicon carbide and the focused spot relative to each other in the Y-axis direction.

The wafer producing method according to a mode of the present invention is configured as described above and is thus capable of efficiently performing chamfering processing on a periphery of a wafer to be produced from an ingot.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

A wafer producing method (wafer processing method) according to an embodiment of the present invention will hereinafter be described with reference to the attached drawings.

Figure 1A:
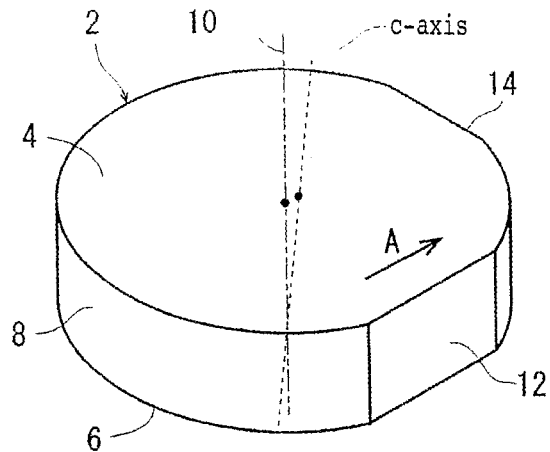
FIG. 1A is a perspective view of an ingot.
Figure 1B:
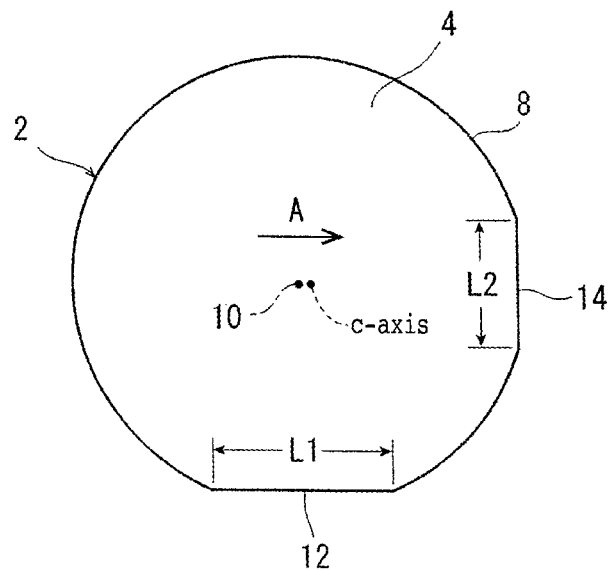
FIG. 1B is a plan view of the ingot illustrated in FIG. 1A.
Figure 1C:
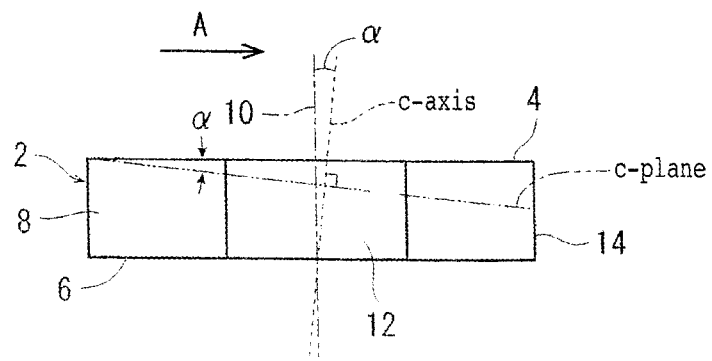
FIG. 1C is a front view of the ingot illustrated in FIG. 1A.

FIGS. 1A to 1C illustrate an ingot 2 which may be used in the wafer producing method, i.e., a wafer processing method, according to an embodiment of the present invention. The ingot 2 illustrated in FIGS. 1A to 1C is formed from a hexagonal single-crystal SiC, but may alternatively be formed of silicon, sapphire, or other materials.

The cylindrical ingot 2 includes a circular first end surface 4, a circular second end surface 6 located on a side opposite to the first end surface 4, a circumferential surface 8 located between the first end surface 4 and the second end surface 6, a c-axis extending from the first end surface 4 to the second end surface 6, and a c-plane perpendicular to the c-axis. At least the first end surface 4 is planarized by being ground or polished to such an extent that entrance of a laser beam is not hindered.

In the ingot 2, the c-axis is inclined with respect to a perpendicular line 10 of the first end surface 4, and an off angle α (for example, α=1°, 3°, or 6°) is formed by the c-plane and the first end surface 4. The direction in which the off angle α is formed is indicated by an arrow A in FIGS. 1A to 1C.

On the circumferential surface 8 of the ingot 2, a first orientation flat 12 and a second orientation flat 14, both being rectangular and indicating a crystal orientation, are formed. The first orientation flat 12 is parallel to a direction A in which the off angle α is formed, while the second orientation flat 14 is orthogonal to the direction A in which the off angle α is formed. As illustrated in FIG. 1B, a length L2 of the second orientation flat 14 is shorter than a length L1 of the first orientation flat 12 when viewed from an upper side (L2<L1).

(Peel-Off Layer Forming Step)

In the embodiment illustrated in the drawings, first, a peel-off layer forming step of forming a peel-off layer by positioning a focused spot of a laser beam having a wavelength transmittable through the ingot 2 to a depth corresponding to a thickness of the wafer to be produced from the ingot 2 from the planarized first end surface 4 of the ingot 2 and then applying the laser beam to the ingot 2 is performed.

Figure 2A:
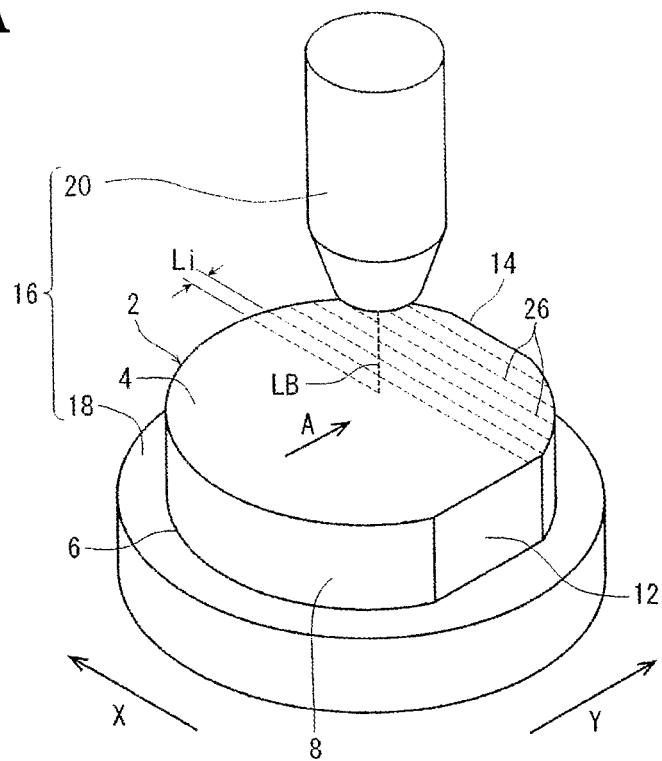
FIG. 2A is a perspective view illustrating a state in which a peel-off layer forming step is carried out.

The peel-off layer forming step can, for example, be carried out by a laser processing apparatus 16 illustrated in FIG. 2A. The laser processing apparatus 16 includes a chuck table 18 that holds under suction the ingot 2, a laser oscillator (not illustrated) that generates a pulsed laser beam LB having a wavelength transmittable through the ingot 2, and a condenser 20 that condenses the pulsed laser beam LB generated by the laser oscillator and then applies the pulsed laser beam LB to the ingot 2 held under suction on the chuck table 18.

The chuck table 18 is configured to be rotatable about an axis extending in a vertical direction and also movable in an X-axis direction indicated by an arrow X in FIG. 2A and a Y-axis direction orthogonal to the X-axis direction (a direction indicated by an arrow Y in FIG. 2A). The condenser 20 applies the pulsed laser beam LB vertically to an upper surface of the ingot 2. Note that an X-Y plane defined by the X-axis direction and the Y-axis direction is substantially horizontal.

Figure 2B:
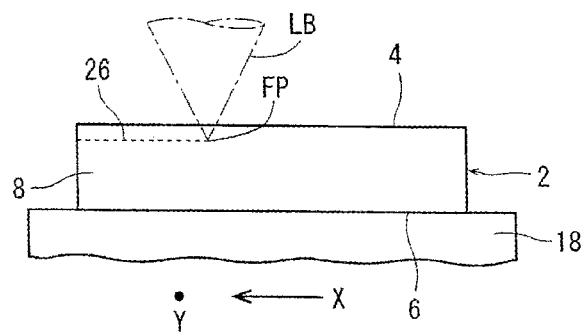
FIG. 2B is a front view illustrating the state in which the peel-off layer forming step is carried out.
Figure 2C:
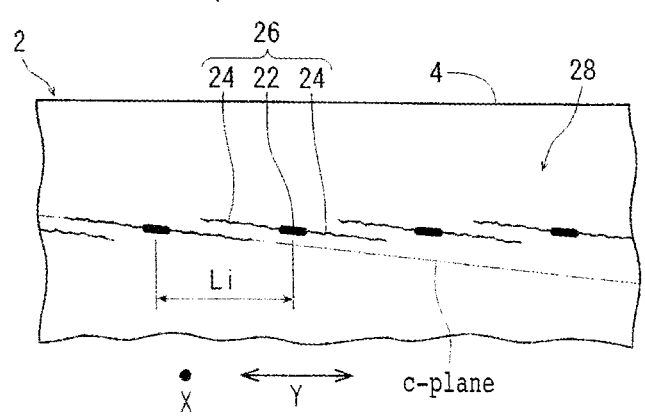
FIG. 2C is a cross sectional view illustrating the ingot in which a peel-off layer has been formed.

Continuously described with reference to FIGS. 2A to 2C, in the peel-off layer forming step, first, the first end surface 4 is oriented upward, and the ingot 2 is held under suction on an upper surface of the chuck table 18. Next, an imaging unit (not illustrated) of the laser processing apparatus 16 images the ingot 2 from an upper side, and the laser processing apparatus 16 adjusts the orientation of the ingot 2 to a predetermined orientation and also adjusts the positional relation between the ingot 2 and the condenser 20 by using an image of the ingot 2 captured by the imaging unit. As illustrated in FIG. 2A, at the time of adjusting the orientation of the ingot 2 to the predetermined orientation, aligning the second orientation flat 14 with the X-axis direction allows a direction orthogonal to the direction A in which the off angle α is formed to be aligned with the X-axis direction and also allows the direction A in which the off angle α is formed to be aligned with the Y-axis direction.

Next, a focused spot FP (see FIG. 2B) is positioned to a depth corresponding to a thickness of the wafer to be produced from the ingot 2 from the first end surface 4 of the ingot 2. Then, a pulsed laser beam LB having a wavelength transmittable through the ingot 2 is applied to the ingot 2 from the condenser 20 while the ingot 2 and the focused spot FP are processing fed relative to each other in the X-axis direction. Consequently, as illustrated in FIG. 2C, a strip-shaped peel-off band 26 obtained from a crack 24 extending along the c-plane from a modified portion 22 in which SiC has been separated into Si and carbon (C) can be formed along the X-axis direction (peel-off band forming step).

Subsequently, the ingot 2 and the focused spot FP are indexing fed relative to each other in the Y-axis direction (indexing feed step). An indexing feed amount Li is set to have a length not exceeding a width of the crack 24, and cracks 24 adjacent to each other in the Y-axis direction are made to overlap as viewed in the vertical direction. Repeating the peel-off band forming step and the indexing feed step in an alternate manner leads to formation of a peel-off layer 28 with the peel-off bands 26 being disposed side by side in the Y-axis direction.

The peel-off layer forming step described above can, for example, be performed under the following processing conditions. Note that the term defocus described below refers to an amount of movement of the condenser 20 toward the first end surface 4 from a state in which the focused spot FP of the pulsed laser beam LB is positioned to the first end surface 4 (upper surface) of the ingot 2.

Wavelength of pulsed laser beam: 1064 nm
Average output: 7 to 16 W
Repetition frequency: 30 kHz
Pulse width: 3 ns
Processing feed speed: 165 mm/s
Defocus: 188 μm
Position of peel-off layer from first end surface: 500 μm
(ID Creating Step)

After the peel-off layer forming step is performed, an identification (ID) creating step of creating an ID by applying a laser beam having a wavelength absorbable by the wafer to be produced from the ingot to a surplus region of the wafer is performed.

Figure 3:
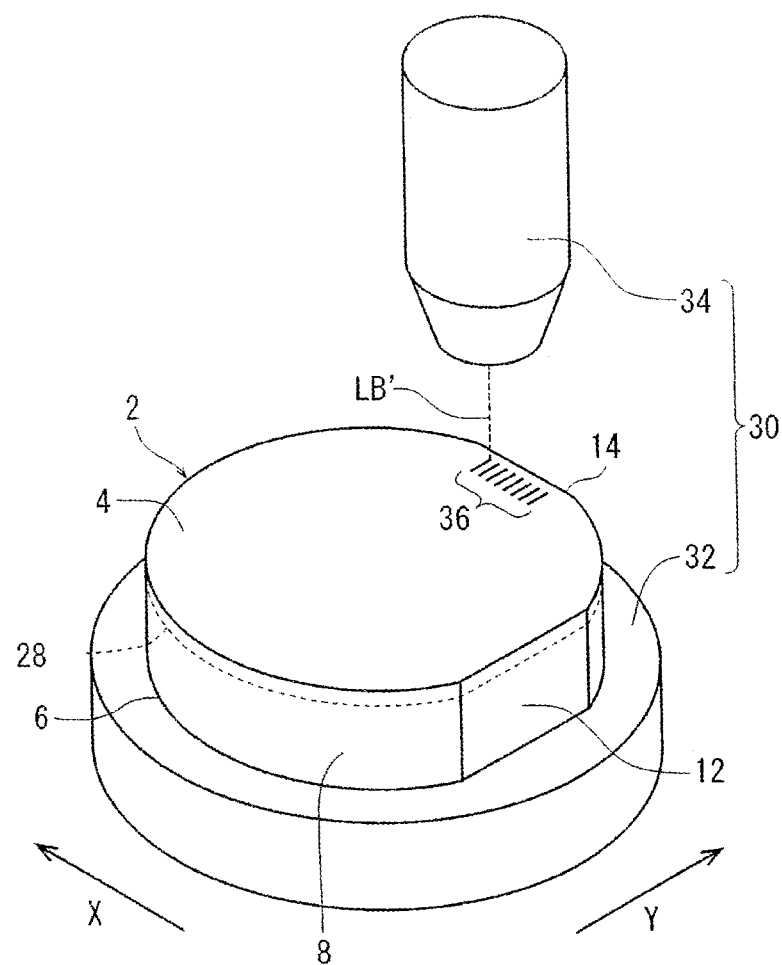
FIG. 3 is a perspective view illustrating a state in which an identification (ID) creating step is carried out.

The ID creating step can, for example, be performed by a laser processing apparatus 30 illustrated in FIG. 3. The laser processing apparatus 30 used to perform the ID creating step includes a chuck table 32 that holds under suction the ingot 2, a laser oscillator (not illustrated) that generates a pulsed laser beam LB' having a wavelength absorbable by the wafer to be produced from the ingot 2, and a condenser 34 that condenses the pulsed laser beam LB' generated by the laser oscillator and then applies the pulsed laser beam LB' to the ingot 2 held under suction on the chuck table 32.

The chuck table 32 is configured to be rotatable about an axis extending in the vertical direction, and also movable in both the X-axis direction and the Y-axis direction. The condenser 34 applies the pulsed laser beam LB' vertically to the upper surface of the ingot 2.

Continuously described with reference to FIG. 3, in the ID creating step, first, the first end surface 4 is oriented upward, and the ingot 2 is held under suction on an upper surface of the chuck table 32. Next, the ingot 2 is imaged, and an image of the ingot 2 thus captured is used to adjust the positional relation between the ingot 2 and the condenser 34. Then, a focused spot is positioned to a surplus region (except the peripheral edge) in which devices are not formed in the first end surface 4 of the ingot 2.

Subsequently, while the ingot 2 and the focused spot are appropriately moved relative to each other, the pulsed laser beam LB' having a wavelength absorbable by the wafer to be produced from the ingot 2 is applied to the ingot 2 from the condenser 34. Consequently, ablation processing is performed on the surplus region in which devices are not formed in the first end surface 4, and an ID 36 which can be configured in the form of a barcode can be created.

In the illustrated embodiment, the ID 36 is created along the second orientation flat 14, but the ID 36 may be created along the first orientation flat 12 or may be created along an arc-shaped peripheral edge, in any surplus region in which devices are not formed.

The ID 36 to be created in the ID creating step can include, for example, such information as the lot number of the ingot 2, the order in which wafers are produced from the ingot 2, the date of manufacture of the wafer, the manufacturing plant of the wafer, and the machine type that has contributed to the production of wafers. Accordingly, in a case where any defect occurs in the device formed on the wafer, the cause for the defect in the device can be investigated by tracing back the manufacturing history of the wafer on the basis of the ID 36, leading to recurrence prevention.

The ID creating step can, for example, be performed under the following processing conditions.

Wavelength of pulsed laser beam: 355 nm
Average output: 3 W
Repetition frequency: 10 kHz
Pulse width: 10 ns
Feed speed: 100 mm/s
(First Chamfered Portion Forming Step)

After the ID creating step is carried out, a first chamfered portion forming step of forming a first chamfered portion in the first end surface 4 by applying, from the first end surface 4 side to a peripheral surplus region of the wafer to be produced from the ingot, a laser beam having a wavelength absorbable by the wafer is performed. Note that the first chamfered portion forming step may be carried out before the ID creating step.

Figure 4A:
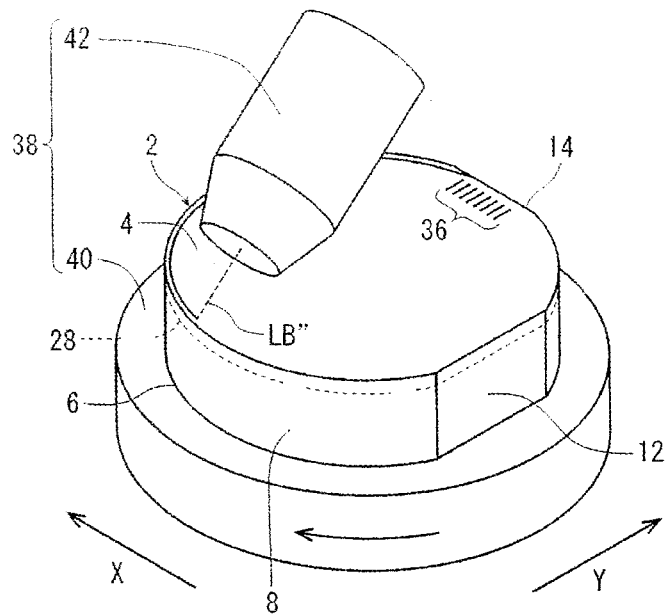
FIG. 4A is a perspective view illustrating a state in which a first chamfered portion forming step is carried out.
Figure 4B:
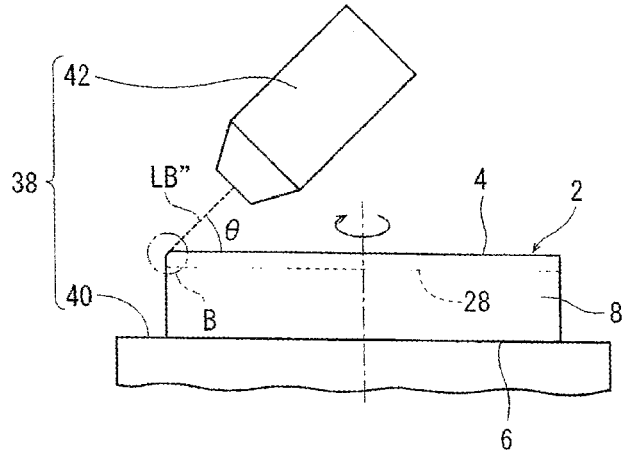
FIG. 4B is a front view illustrating the state in which the first chamfered portion forming step is carried out.

The first chamfered portion forming step can, for example, be performed by a laser processing apparatus 38 illustrated in FIGS. 4A and 4B. The laser processing apparatus 38 used to perform the first chamfered portion forming step includes a chuck table 40 that holds under suction the ingot 2, a laser oscillator (not illustrated) that generates a pulsed laser beam LB" having a wavelength absorbable by the wafer to be produced from the ingot 2, and a condenser 42 that condenses the pulsed laser beam LB" generated by the laser oscillator and then applies the pulsed laser beam LB" to the ingot 2 held under suction on the chuck table 40.

The chuck table 40 is configured to be rotatable about an axis extending in the vertical direction, and also movable in both the X-axis direction and the Y-axis direction. The condenser 42 applies the pulsed laser beam LB" to the upper surface of the ingot 2 in an inclined manner. An angle θ formed by the upper surface of the ingot 2 and the direction in which the pulsed laser beam LB" is applied (see FIG. 4B) is, for example, approximately 45°.

Figure 4C:
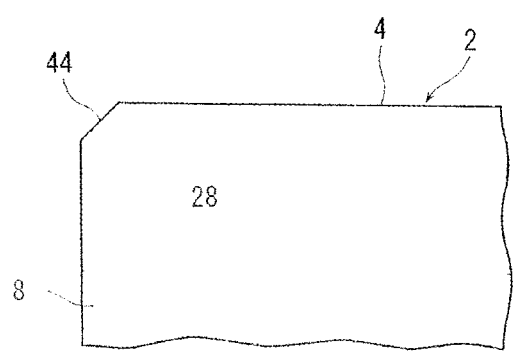
FIG. 4C is an enlarged view of a portion B illustrated in FIG. 4B.

Continuously described with reference to FIGS. 4A to 4C, in the first chamfered portion forming step, first, the first end surface 4 is oriented upward, and the ingot 2 is held under suction on the upper surface of the chuck table 40. Next, the ingot 2 is imaged, and an image of the ingot 2 thus captured is used to adjust the positional relation between the ingot 2 and the condenser 42. Then, a focused spot is positioned to a peripheral surplus region of the wafer to be produced from the ingot 2, in the first end surface 4 of the ingot 2.

Subsequently, as illustrated in FIGS. 4A and 4B, while the chuck table 40 is rotated at a predetermined speed, the pulsed laser beam LB" having a wavelength absorbable by the wafer to be produced from the ingot 2 is applied to the peripheral surplus region (peripheral edge) on the first end surface 4 side. Consequently, ablation processing is performed on the peripheral surplus region on the first end surface 4 side, and a first chamfered portion 44 is formed in the first end surface 4 as illustrated in FIG. 4C.

As the ingot 2 according to the illustrated embodiment is formed with the first and second orientation flats 12 and 14, when the pulsed laser beam LB" is applied along the first and second orientation flats 12 and 14, the chuck table 40 is appropriately moved in the X-axis direction and the Y-axis direction, so that the focused spot is moved along the first and second orientation flats 12 and 14. This leads to the pulsed laser beam LB" being applied to the whole circumference of the peripheral surplus region on the first end surface 4 side.

The first chamfered portion forming step can, for example, be performed under the following processing conditions.

Wavelength of pulsed laser beam: 355 nm
Average output: 3 W
Repetition frequency: 10 kHz
Pulse width: 10 ns
Feed speed: 100 mm/s
(Peeling-Off Step)

After the first chamfered portion forming step is carried out, a peeling-off step of peeling off, from the peel-off layer 28, a wafer to be produced is performed.

Figure 5:
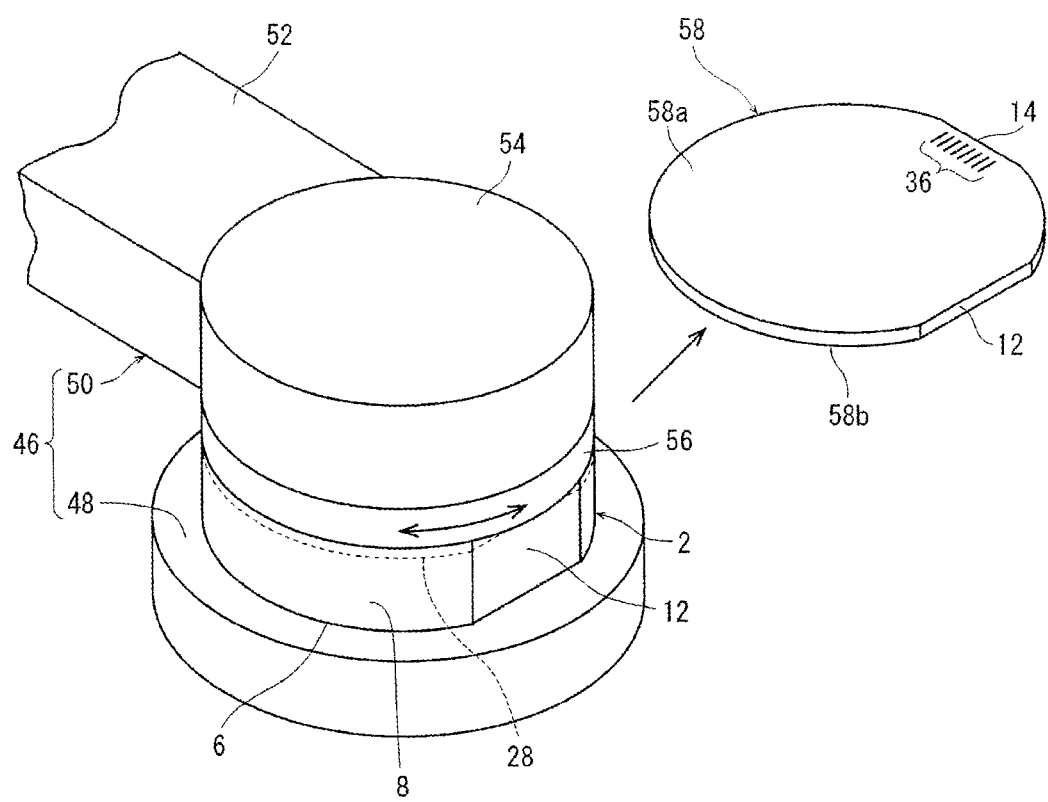
FIG. 5 is a perspective view illustrating a state in which a peeling-off step is carried out.

The peeling-off step can, for example, be performed by a peeling apparatus 46 illustrated in FIG. 5. The peeling apparatus 46 includes a chuck table 48 that holds under suction the ingot 2 and peeling unit 50 that peels off part of the ingot 2 held under suction on the chuck table 48.

The peeling unit 50 includes an arm 52 extending in a substantially horizontal manner and a motor 54 that is disposed on a distal end of the arm 52. The motor 54 has a lower surface to which a circular plate-shaped suction piece 56 is coupled in a manner rotatable about an axis extending in the vertical direction. The suction piece 56 that attracts under suction the upper surface of the ingot 2 at its lower surface has incorporated therein an ultrasonic vibration applying unit (not illustrated) that applies an ultrasonic vibration to the lower surface of the suction piece 56.

Continuously described with reference to FIG. 5, in the peeling-off step, first, the first end surface 4 is oriented upward, and the ingot 2 is held under suction on an upper surface of the chuck table 48. Next, a lifting/lowering mechanism (not illustrated) of the peeling apparatus 46 lowers the arm 52, to cause the lower surface of the suction piece 56 to be attracted under suction to the first end surface 4 of the ingot 2. Then, the ultrasonic vibration applying unit is operated to apply an ultrasonic vibration to the lower surface of the suction piece 56, and the motor 54 is operated to rotate the suction piece 56. As a result, the wafer denoted by 58 can be peeled off from the peel-off layer 28 of the ingot 2. Note that, while a front surface 58a of the wafer 58 which has previously been the first end surface 4 of the ingot 2 is flat, a back surface 58b of the wafer 58 which is a peel-off surface has surface irregularities.

(Second Chamfered Portion Forming Step)

After the peeling-off step is carried out, a second chamfered portion forming step of forming a second chamfered portion by applying, from the peel-off surface side (back surface 58 side) of the wafer 58 to a peripheral surplus region on the peel-off surface of the wafer 58, a laser beam having a wavelength absorbable by the wafer 58 is performed. The second chamfered portion forming step can be carried out by the laser processing apparatus 38 used in the first chamfered portion forming step.

Described with reference to FIGS. 6A, 6B, and 6C, in the second chamfered portion forming step, first, the peel-off surface (back surface 58b) of the wafer 58 is oriented upward, and the wafer 58 is held under suction on the upper surface of the chuck table 40. Next, the wafer 58 is imaged, and an image of the wafer 58 thus captured is used to adjust the positional relation between the wafer 58 and the condenser 42. Then, a focused spot is positioned to the peripheral surplus region on the peel-off surface of the wafer 58.

Figure 6A:
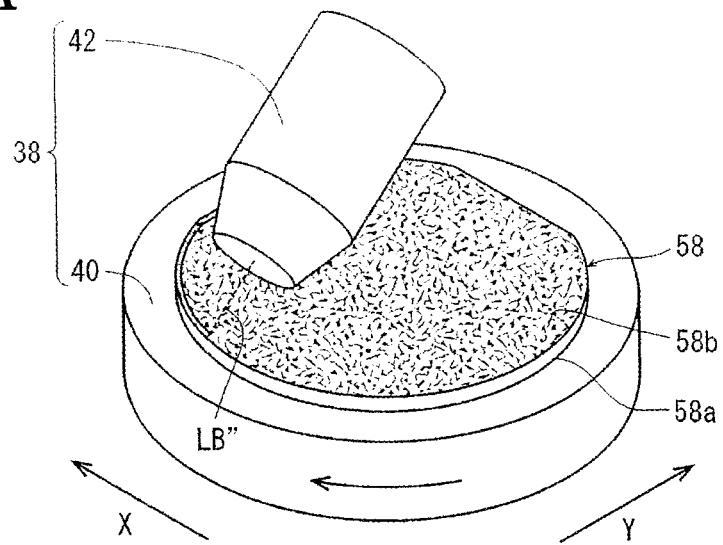
FIG. 6A is a perspective view illustrating a state in which a second chamfered portion forming step is carried out.
Figure 6B:
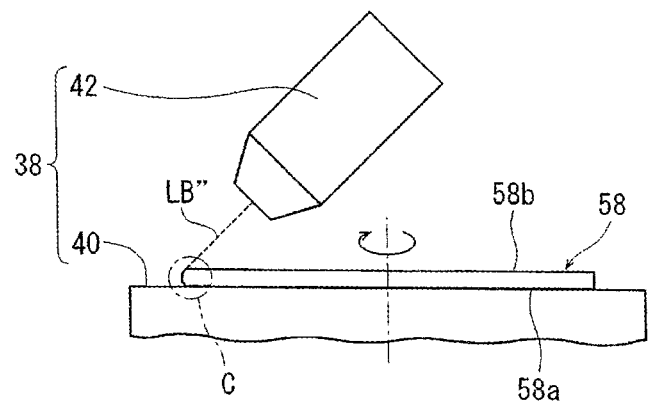
FIG. 6B is a front view illustrating the state in which the second chamfered portion forming step is carried out.
Figure 6C:
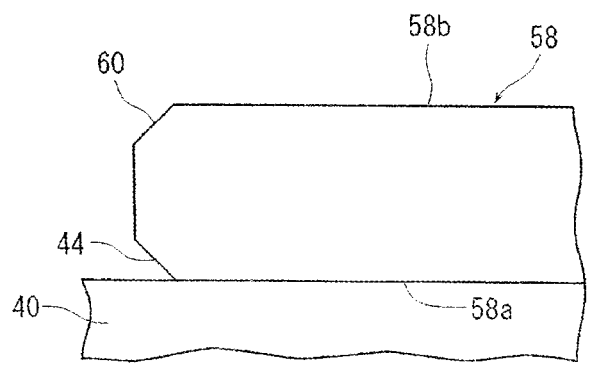
FIG. 6C is an enlarged view of a portion C illustrated in FIG. 6B.

Subsequently, as illustrated in FIGS. 6A and 6B, while the chuck table 40 is rotated at a predetermined speed, a pulsed laser beam LB" having a wavelength absorbable by the wafer 58 is applied to the peripheral surplus region (peripheral edge) on the peel-off surface of the wafer 58. Consequently, ablation processing is performed on the peripheral surplus region on the peel-off surface of the wafer 58, and a second chamfered portion 60 can be formed on the peel-off surface of the wafer 58 as illustrated in FIG. 6C.

As in the first chamfered portion forming step, when the pulsed laser beam LB" is applied along the first and second orientation flats 12 and 14, the chuck table 40 is appropriately moved in the X-axis direction and the Y-axis direction, so that the focused spot is moved along the first and second orientation flats 12 and 14. This leads to the pulsed laser beam LB" being applied to the whole circumference of the peripheral surplus region on the peel-off surface side of the wafer 58. Note that the processing conditions to be used in the second chamfered portion forming step may be the same as the processing conditions used in the first chamfered portion forming step.

(Chamfered Portion Grinding Step)

After the second chamfered portion forming step is carried out, a chamfered portion grinding step of grinding the first chamfered portion 44 and the second chamfered portion 60 is performed.

Figure 7A:
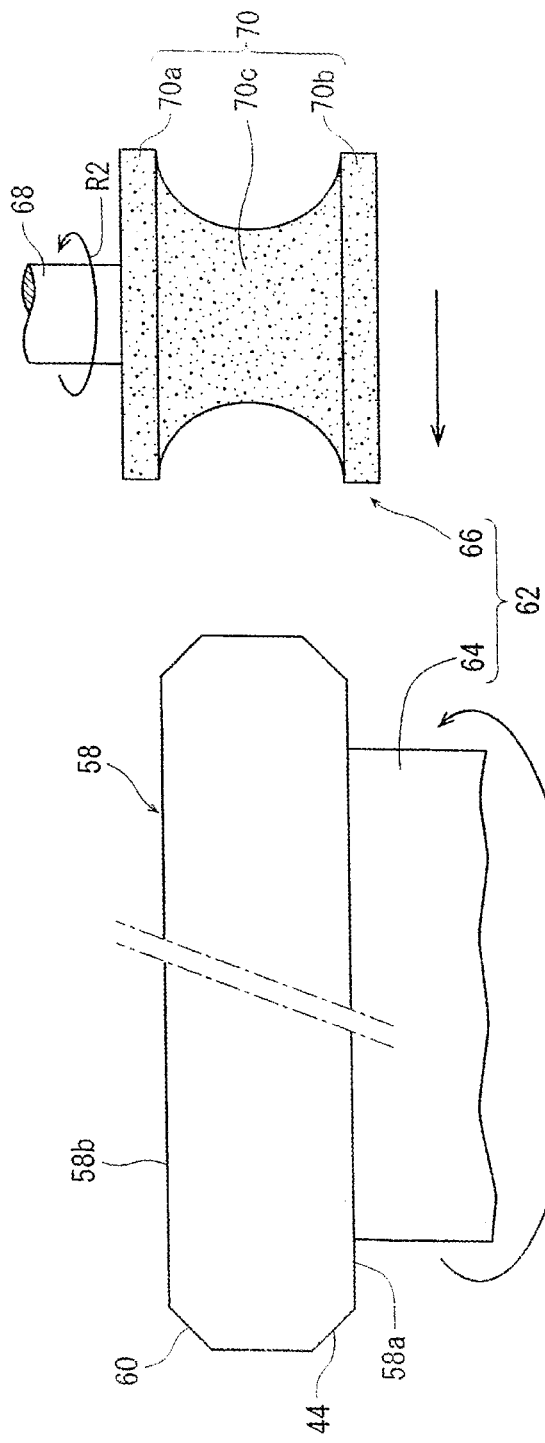
FIG. 7A is a front view illustrating a state in which a chamfered portion grinding step is carried out.

The chamfered portion grinding step can, for example, be carried out by a grinding apparatus 62 illustrated in FIG. 7A. The grinding apparatus 62 includes a chuck table 64 that holds under suction the wafer 58 and a grinding unit 66 that grinds the periphery of the wafer 58 held under suction on the chuck table 64.

The chuck table 64 is circular and, as illustrated in FIG. 7A, has a diameter smaller than the diameter of the wafer 58. In addition, the chuck table 64 is configured to be rotatable about an axis extending in the vertical direction. The grinding unit 66 includes a spindle 68 extending in the vertical direction and a grinding stone 70 fixed to a lower end of the spindle 68.

The grinding stone 70 includes a cylindrical upper portion 70a, a cylindrical lower portion 70b, and a narrow portion 70c positioned between the upper portion 70a and the lower portion 70b. As can be understood by referring to FIG. 7A, the narrow portion 70c has a diameter that gradually decreases from an upper end toward an intermediate portion in the vertical direction but gradually increases from the intermediate portion in the vertical direction toward a lower end. The narrow portion 70c has a circular arc-shaped periphery in cross section. In addition, the narrow portion 70c has a size that is substantially identical to the thickness of the wafer 58 in the vertical direction.

Continuously described with reference to FIG. 7A, in the chamfered portion grinding step, first, in a state in which a center of the wafer 58 is adjusted to a center of rotation of the chuck table 64, the peel-off surface (back surface 58b) of the wafer 58 is oriented upward, and the wafer 58 is held under suction on an upper surface of the chuck table 64. Next, the chuck table 64 is rotated in a direction indicated by an arrow R1. Further, the grinding stone 70 is rotated together with the spindle 68 in a direction indicated by an arrow R2.

Figure 7B:
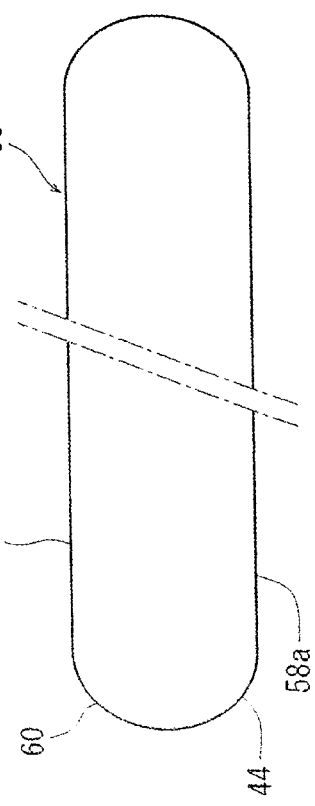
FIG. 7B is a front view of a wafer of which the chamfered portion has been ground.

Subsequently, a moving mechanism (not illustrated) of the grinding apparatus 62 moves the grinding unit 66 toward the chuck table 64, to cause the narrow portion 70c of the grinding stone 70 to come into contact with the periphery of the wafer 58. Following this, the grinding apparatus 62 supplies grinding water to the peripheral portion of the wafer 58 with which the grinding stone 70 has come into contact. Then, after causing the grinding stone 70 to come into contact with the periphery of the wafer 58, the grinding apparatus 62 moves the grinding unit 66 at a predetermined grinding feed speed such that the grinding stone 70 is pressed against the wafer 58. As a result, the first chamfered portion 44 and the second chamfered portion 60 are ground and finished to have a smooth surface, as illustrated in FIG. 7B.

In the illustrated embodiment, prior to the chamfered portion grinding step, the first and second chamfered portions 44 and 60 are formed on the periphery of the wafer 58, thus contributing to a relatively small amount of grinding in the chamfered portion grinding step. Typically, when the wafer 58 is made of a hard material, as exemplified by SiC, a longer grinding processing time is required. Yet, as described above, in the illustrated embodiment, even if the wafer 58 is made of a hard material, a relatively small amount of grinding is required, thus leading to a shorter grinding processing time. Accordingly, the chamfered processing can be performed efficiently on the periphery of the wafer 58.

(Wafer Peel-Off Surface Planarizing Step)

After the chamfered portion grinding step is carried out, a wafer peel-off surface planarizing step of grinding and planarizing the peel-off surface of the wafer 58 is performed.

Figure 8:
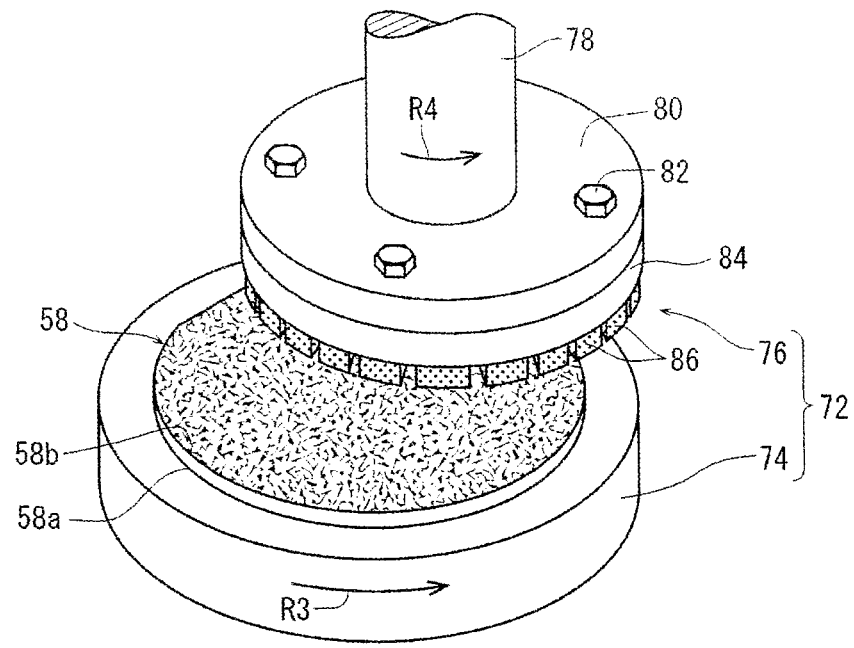
FIG. 8 is a perspective view illustrating a state in which a wafer peel-off surface planarizing step is carried out.

The wafer peel-off surface planarizing step can, for example, be carried out by a grinding apparatus 72 illustrated in FIG. 8. The grinding apparatus 72 includes a chuck table 74 that holds under suction the wafer 58 and a grinding unit 76 that grinds the wafer 58 held under suction on the chuck table 74.

The chuck table 74 is configured to be rotatable about an axis extending in the vertical direction. The grinding unit 76 includes a spindle 78 extending in the vertical direction and a circular plate-shaped wheel mount 80 fixed to a lower end of the spindle 78. The wheel mount 80 has a lower surface to which an annular grinding wheel 84 is fastened by bolts 82. To a peripheral edge on a lower surface of the grinding wheel 84, multiple grinding stones 86 disposed in an annular shape at intervals in a circumferential direction are fixed.

As illustrated in FIG. 8, in the wafer peel-off surface planarizing step, first, the peel-off surface (back surface 58b) of the wafer 58 is oriented upward, and the wafer 58 is held under suction on an upper surface of the chuck table 74. Next, the chuck table 74 is rotated at a predetermined rotational speed (for example, 300 rpm) in an R3 direction. Further, the spindle 78 is rotated at a predetermined rotational speed (for example, 6000 rpm) in an R4 direction.

Subsequently, a lifting/lowering mechanism (not illustrated) of the grinding apparatus 72 lowers the spindle 78, to cause the grinding stones 86 to come into contact with the peel-off surface (back surface 58b) of the wafer 58. Further, the grinding apparatus 72 supplies grinding water to a portion of the peel-off surface of the wafer 58 with which the grinding stones 86 have come into contact. Then, after causing the grinding stones 86 to come into contact with the peel-off surface of the wafer 58, the grinding apparatus 72 lowers the spindle 78 at a predetermined grinding feed speed (for example, 1.0 μm/s). This allows the peel-off surface of the wafer 58 to be ground and consequently planarized.

(Mirror Surface Processing Step)

After the wafer peel-off surface planarizing step is carried out, a mirror surface processing step of performing mirror surface processing on the front surface 58a and the back surface 58b of the wafer 58 is performed.

Figure 9:
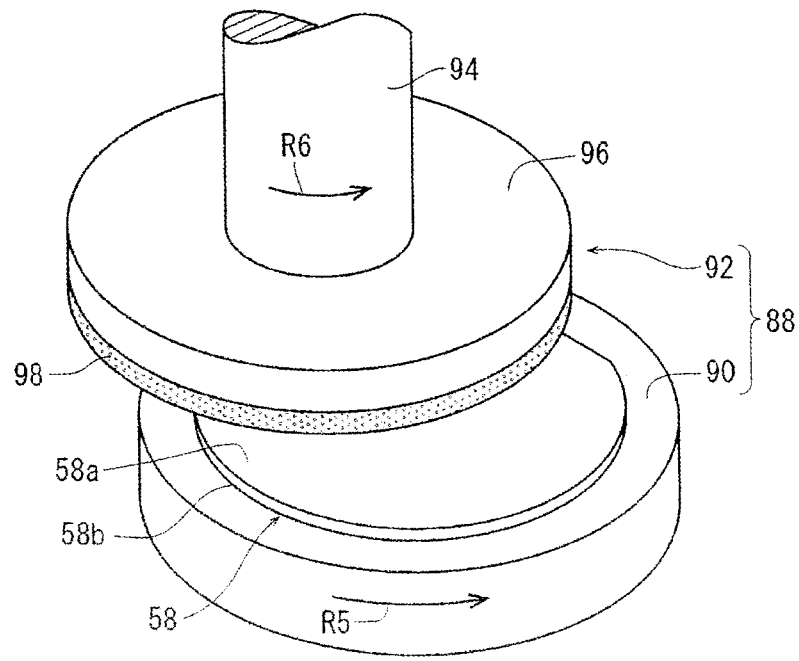
FIG. 9 is a perspective view illustrating a state in which a mirror surface processing step is carried out.

The mirror surface processing step can, for example, be carried out by a polishing apparatus 88 illustrated in FIG. 9. The polishing apparatus 88 includes a chuck table 90 that holds under suction the wafer 58 and a polishing unit 92 that polishes the wafer 58 held under suction on the chuck table 90.

The chuck table 90 is configured to be rotatable about an axis extending in the vertical direction. The polishing unit 92 includes a spindle 94 extending in the vertical direction, a circular plate-shaped base 96 fixed to a lower end of the spindle 94, and a polishing pad 98 fixed to a lower surface of the base 96. The polishing pad 98 can, for example, be formed of an urethane foam sheet.

Continuously described with reference to FIG. 9, in the mirror surface processing step, first, the front surface 58a of the wafer 58 is oriented upward, and the wafer 58 is held under suction on an upper surface of the chuck table 90. Next, the chuck table 90 is rotated in an R5 direction. Further, the spindle 94 is rotated in an R6 direction.

Subsequently, while a slurry supply source (not illustrated) of the polishing apparatus 88 supplies slurry to a portion between the front surface 58a of the wafer 58 and a lower surface of the polishing pad 98, the lower surface of the polishing pad 98 is pressed against the front surface 58a of the wafer 58. This allows the front surface 58a of the wafer 58 to be polished and finished to a mirror surface. Note that the mirror surface processing is also similarly performed on the back surface 58b of the wafer 58.

(Ingot Peel-Off Surface Planarizing Step)

After the peeling-off step is carried out, concurrently with, for example, the second chamfered portion forming step described above, an ingot peel-off surface planarizing step of grinding and planarizing a peel-off surface of the ingot 2 is performed. The ingot peel-off surface planarizing step can be carried out by the grinding apparatus 72 used in the wafer peel-off surface planarizing step.

Figure 10:
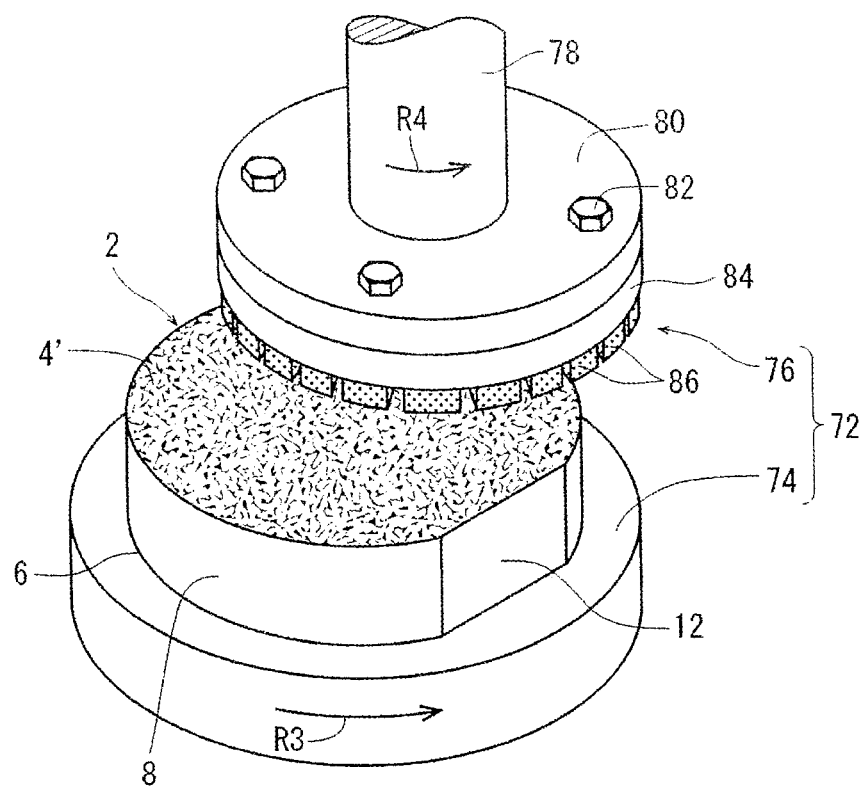
FIG. 10 is a perspective view illustrating a state in which an ingot peel-off surface planarizing step is carried out.

As illustrated in FIG. 10, in the ingot peel-off surface planarizing step, first, a peel-off surface 4' of the ingot 2 is oriented upward, and the ingot 2 is held under suction on the upper surface of the chuck table 74. Next, the chuck table 74 is rotated in the R3 direction. Further, the spindle 78 is rotated in the R4 direction.

Subsequently, the spindle 78 is lowered, and the grinding stones 86 are caused to come into contact with the peel-off surface 4' of the ingot 2. In addition, grinding water is supplied to a portion of the peel-off surface 4' with which the grinding stones 86 have come into contact. Then, after the grinding stones 86 have come into contact with the peel-off surface 4' of the ingot 2, the spindle 78 is lowered at a predetermined grinding feed speed. This allows the peel-off surface 4' of the ingot 2 to be ground and planarized.

Note that, after the peel-off surface 4' of the ingot 2 has been planarized, the mirror surface processing similar to the abovementioned mirror surface processing performed on the front surface 58a and the back surface 58b of the wafer 58 may be performed on the peel-off surface 4' of the ingot 2.

Then, after the ingot peel-off surface planarizing step is carried out, the abovementioned steps can repeatedly be carried out, so that multiple pieces of wafers 58 can be produced from the ingot 2, and the chamfered processing can efficiently be performed on the periphery of the wafers 58 produced.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A wafer producing method, comprising:
    a peel-off layer forming step of forming a peel-off layer by positioning a focused spot of a laser beam having a wavelength transmittable through an ingot to a depth corresponding to a thickness of a wafer to be produced from a planarized first end surface of the ingot and applying the laser beam to the ingot;
    a first chamfered portion forming step of forming on the ingot a first chamfered portion on the first end surface of the ingot by applying, from the first end surface side to a peripheral surplus region of the wafer to be produced, a laser beam having a wavelength absorbable by the wafer to be produced;
    a peeling-off step of peeling off, from the peel-off layer, the wafer to be produced; and
    a second chamfered portion forming step of forming a second chamfered portion by applying, from a peel-off surface side of a wafer peeled-off from the ingot to a peripheral surplus region on the peel-off surface of the wafer, the laser beam having a wavelength absorbable by the wafer.

2. The wafer producing method according to claim 1, further comprising:
    after the peel-off layer forming step, an identification creating step of creating an identification by applying, to a surplus region of the wafer, the laser beam having a wavelength absorbable by the wafer.

3. The wafer producing method according to claim 1, further comprising:
    a chamfered portion grinding step of grinding the first chamfered portion and the second chamfered portion.

4. The wafer producing method according to claim 1, further comprising:
    a wafer peel-off surface planarizing step of grinding and planarizing the peel-off surface of the wafer.

5. The wafer producing method according to claim 4, further comprising:
    a mirror surface processing step of performing mirror surface processing on a front surface and a back surface of the wafer.

6. The wafer producing method according to claim 1, further comprising:
    after the peeling-off step, an ingot peel-off surface planarizing step of grinding and planarizing a peel-off surface of the ingot.

7. The wafer producing method according to claim 1, wherein
    the ingot is an ingot made of silicon carbide, and the wafer is a wafer made of silicon carbide.

8. The wafer producing method according to claim 7, wherein
    a c-plane of the ingot made of silicon carbide is inclined with respect to a perpendicular line of the first end surface, and forms an off angle with the first end surface, and,
    in the peel-off layer forming step, the peel-off layer is formed with strip-shaped peel-off bands being disposed side by side in a Y-axis direction, the peel-off bands being obtained from cracks extending along the c-plane from a modified portion in which silicon carbide has been separated into silicon and carbon, by repeating
        a peel-off band forming step of forming the peel-off bands, by assuming a direction orthogonal to a direction in which the off angle is formed to be an X-axis direction and a direction orthogonal to the X-axis direction to be the Y-axis direction, positioning a focused spot of a laser beam having a wavelength transmittable through the ingot made of silicon carbide to a depth corresponding to a thickness of the wafer to be produced from the ingot, and applying the laser beam to the ingot made of silicon carbide while processing feeding the ingot made of silicon carbide and the focused spot relative to each other in the X-axis direction, and
        an indexing feed step of indexing feeding the ingot made of silicon carbide and the focused spot relative to each other in the Y-axis direction.

9. The wafer producing method according to claim 1, wherein
    the peeling-off step is performed after the first chamfered portion forming step, and
    the second chamfered portion forming step is performed after the peeling-off step.

\* \* \* \* \*